Patented Apr. 24, 1951

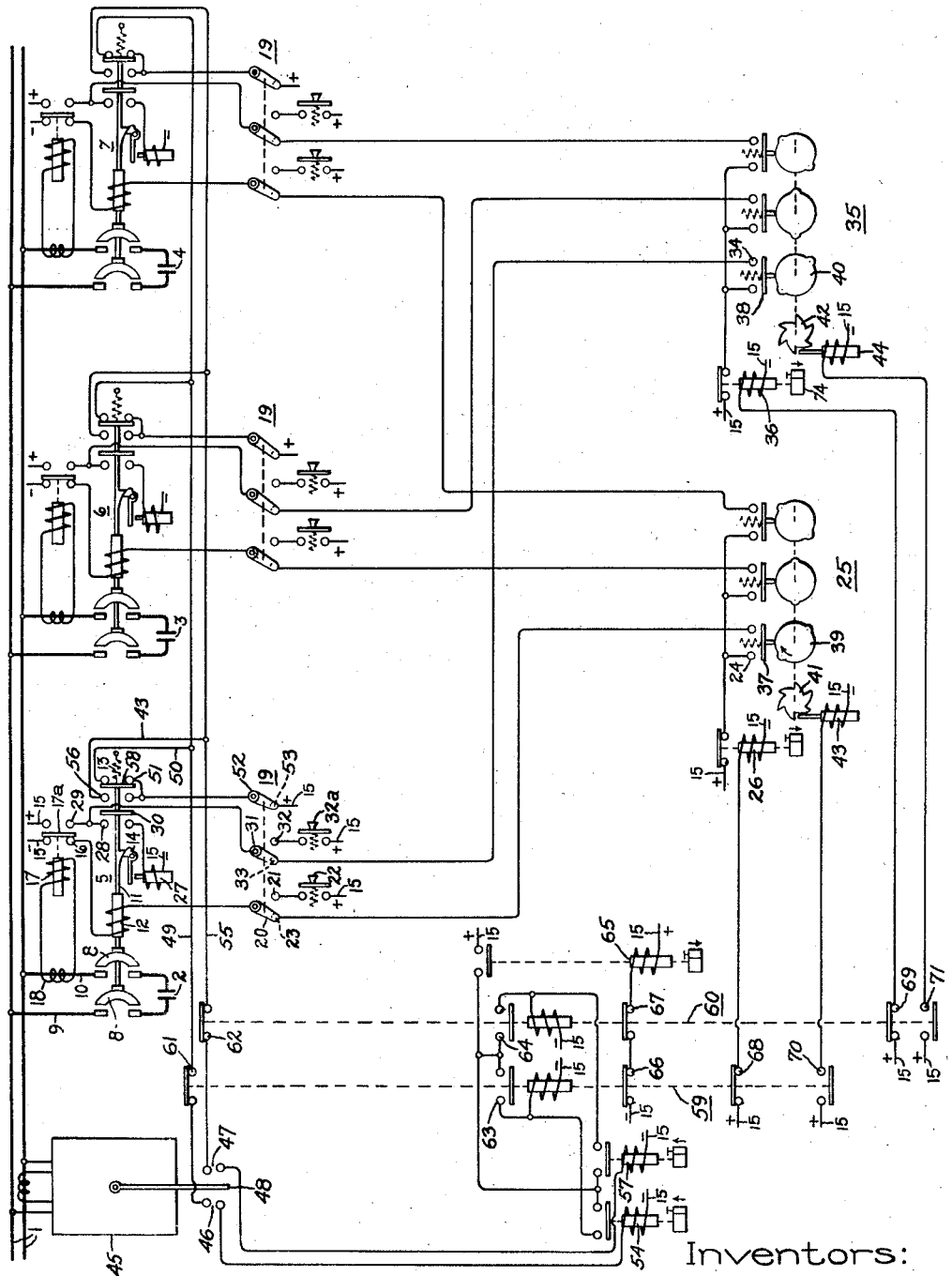

2,550,506

UNITED STATES PATENT OFFICE 2,550,506

AUTOMATIC SELECTIVE SWITCHING EQUIPMENT

Orville Wasson, Havertown, and James R. Palmer, Yeadon, Pa., assignors to General Electric Company, a corporation of New York Application May 9, 1950, Serial No. 160,878

3 Claims. (Cl. 323—105)

Our invention relates to power circuits and, more particularly, to power circuits having a plurality of capacitors for compensating excess flow of reactive volt-amperes therein and has for its object the provision of a device for automatically connecting and disconnecting the power circuit and the capacitors in a predetermined sequence to equalize wear on individual capacitor switching equipments.

In accordance with our invention, we provide a device responsive to increase in flow of reactive-volt-amperes above a predetermined value in a circuit supplied by an A. C. source. A var relay connected to the circuit responsive to the excess increase in flow energizes a closing starting relay which, in turn, energizes a closing operating relay connected to a closing sequential switch which closes circuit breakers between the circuit and capacitors. This sequence is repeated until enough capacitors to compensate for the excess are connected to the circuit or until there are no more capacitors to be connected.

As the reactive volt-amperes in the circuit decrease the var relay responds to energize similar relays and a similar switch which opens the circuit breakers and disconnects the capacitors until the decrease is compensated.

The opening and the closing sequential switches are synchronized so that the first capacitor connected is the first to be disconnected.

For a more complete understanding of our invention, reference is made to the accompanying drawing, the single figure of which is a schematic view of one embodiment of our invention.

According to the drawing, an alternating current power line 1 is selectively connected to a bank of capacitors represented by capacitors 2, 3 and 4 by circuit breakers 5, 6 and 7 having moving contacts 8 to connect the capacitors to power line 1 through leads 9 and 10. Contacts 8 are mounted upon armatures 11 of solenoids 12 and the circuit breakers are held in closed position against the force of springs 13 by latches 14. The coils of solenoids 12 are each connected at one end to one side of an auxiliary power source 15 through stationary contacts 16 of a hand reset lockout relay 17. Connection is made between contacts 16 by normally closed contacts 17a of relays 17. The other ends of the coils of solenoids 12 are connected to contacts 20 of switches 19 selectively operative between stationary contacts 21 connected through manually operated switches 22 to source 15 and stationary contacts 23. A pair of stationary contacts 24 of a continuously repeating ratchet type switch 25 are connected in series with normally closed contacts of closing action relays 26 between contact 23 and source 15. Relays 26 will be described later.

Trips 14 are operated by solenoids 27 connected in series with contacts 28 and 29 to source 15. Contacts 29 are closed by contacts 17a of relays 17 and contacts 28 are closed by auxiliary contacts 30 of circuit breaker 5. A point between contacts 28 and 29 is connected to a movable contact 31 of switch 19 selectively operative between stationary contacts 32 and 33. Contact 32 is connected through a manually operated switch 32a to source 15. A pair of stationary contacts 34 of an opening continuously repeating ratchet type switch 35 is connected in series with normally closed contacts of opening action relay 36 between contact 33 and source 15. Relays 36 will be described later.

When movable contacts 20 and 31 respectively contact stationary contacts 21 and 32, circuit breaker 5 may be operated by manual switches 22 and 32a. Contacts 23 and 33 respectively are for automatic operation.

Switches 25 and 35 are provided with movable contacts 37 and 38 and operating cams 39 and 40. Cams 39 and 40 are each constructed with two raised portions 180 degrees apart to close contacts 24 and 37 and contacts 34 and 38. Ratchets 41 and 42 are provided upon switches 25 and 35 respectively coaxial with cams 39 and 40. Ratchets 41 and 42 are respectively actuated by solenoids 43 and 44 and cams 39 and 40 are staggered upon their respective shafts so that as either solenoid 43 or 44 is energized a corresponding set of contacts is closed.

A var relay 45, connected to power line 1, is provided with stationary contacts 46 and 47 and a movable contact 48 for connecting contacts 46 in response to a flow of reactive volt-amperes in circuit 1 in excess of a predetermined value and for connecting contacts 47 in response to diminution of the excess flow.

Contacts 46 are connected in series with conductor 49, contact 61 described later, conductor 50, stationary contacts 51 of the circuit breakers, movable contact 52 and stationary contact 53 of switch 19 and the coil of a closing starting relay 54 to source 15.

Contacts 47 are connected in series with conductors 55, and 43 (contact 62 to be described later) contacts 56 and the coil of an opening starting relay 57 to source 15. Contacts 51 and 56 are closed by movable contact 58 on the circuit breakers.

Normally open contacts of relays 54 and 57 are respectively connected in series with the coils of operating relays 59 and 60 to source 15. Normally closed contacts 61 and 62, provided upon relays 59 and 60 are respectively connected between relays 54 and 57 and source 15 to disconnect the power source from relays 54 and 57 when relays 59 and 60 are energized.

Normally open contacts 63 and 64 are provided upon relays 59 and 60 respectively and are respectively connected in parallel with the contacts of relays 54 and 57 and in series with the coils of relays 59 and 60 and source 15. The coil of an energizing relay 65 is connected in series through normally closed contacts 66 and 67 upon relays 59 and 60 respectively to source 15. A normally open contact of relay 65 is connected between source 15 and the coils of relays 59 and 60 to close when source 15 is energized. Relay 65 is a time delay relay to maintain energization of the coils when contacts 61 and 62 and 66 and 67 are open. Relays 26 and 36 are respectively connected in series with normally closed contacts 68 and 69 on relays 59 and 60 to source 15. Relays 43 and 44 are respectively connected in series with normally open contacts 70 and 71 on relays 59 and 60 to source 15.

The time delay of relay 65 is provided to allow switches 25 and 35 time to operate one of the circuit breakers and the time delay of relays 26 and 36 is made shorter than that of relay 65 so that the device is in condition for re-energization after each operation of the circuit breakers.

Relays 26 and 36 are time delay relays to disconnect power from switches 25 and 35 until contact is completed between one of the pair of contacts 24 and 37 or 34 and 38.

The shafts of switches 25 and 35 are synchronized so that the first capacitor connected is the first to be disconnected to insure equal wear on all of the capacitors 2, 3 and 4, and the circuit breakers 5, 6 and 7.

While certain specific embodiments have been shown and described, it will, of course, be understood that various modifications may be made without departing from the invention. The appended claims are, therefore, intended to cover any such modifications within the true spirit and scope of the invention.

What we claim as new and desire to secure by Letters Patent of the United States is:

1. A control device for automatically connecting and disconnecting an alternating current power circuit and a plurality of capacitors for regulating the flow of reactive volt-amperes in said circuit comprising a power source, closing and opening starting relays, a var relay connected to said circuit and connected between said starting relays and said source, said var relay being responsive to increased flow of volt-amperes in said circuit in excess of a predetermined value to energize said closing starting relay and responsive to diminution of said excess flow to energize said closing starting relay, closing and opening operating relays respectively energized by said starting relays, said operating relays having normally closed contacts respectively connected between said source and said starting relays, a time delay energizing relay having normally closed contacts connected between said operating relays and said source and energized by said source through a pair of closed contacts upon said operating relays to energize said operating relays after said starting relays are de-energized, circuit breakers connected between each of said capacitors and said power circuit, sequential switches respectively connected through normally open contacts upon said operating relays to said source, said switches having contacts connected to the energizing and trip circuits of said capacitors for closing and opening said circuit breakers according to a predetermined sequence, whereby said capacitors are connected to said circuit in predetermined sequence and disconnected from said circuit in the sequence to which they are connected thereto.

2. A control device for an alternating current power circuit having a plurality of capacitors for regulating the power factor therein, circuit breakers connecting said capacitors and said power circuit in parallel, a power source, sequential switches having contacts connected to the closing and opening circuits of said circuit breakers, said control device comprising opening and closing starting time delay relays having normally open contacts, a var relay connected to said power circuit for sensing the flow of reactive volt-amperes therein and connected between said power source and the coils of said starting relays, thereby to energize said closing starting relay responsive to increase in said flow in excess of a predetermined value and responsive to diminution of said increase to energize said closing starting relays, closing and opening operating relays having coils respectively connected in series with said starting relay contacts to said power source and having a pair of normally closed contacts respectively connected between said power source and said starting relays to disconnect power from said starting relays when said operating relays are energized, an energizing time delay relay having normally open contacts connected between said operating relays and connected in series with normally closed contacts on said operating relays to said power source to energize said power source after de-energization of said starting relays, thereby to allow a complete operation of one of said circuit breakers by said switches before said operating coils are de-energized, the time delay of said starting relays being shorter than the time delay of said energizing relay whereby after said operation said device is in condition for re-energization by said var relay.

3. A control device for an alternating current power circuit including a power line, a plurality of capacitors for compensating an excess flow of reactive volt-amperes therein, a power source, circuit breakers connected in parallel between said capacitors and said power line, sequential solenoid switches connected to said circuit breakers for closing and opening said circuit breakers according to a predetermined sequence, and a var relay connected to said circuit for sensing reactive volt-amperes therein, said control device comprising closing and opening starting relays connected to said var relay, said var relay being responsive to increase in flow of reactive volt-amperes in said power line and to diminution of said flow respectively to energize said starting solenoids, closing and opening operating relays respectively energized by said starting relays and having normally closed contacts respectively connected between said starting relays and said power source to de-energize said starting relays when said operating relays are energized, a time delay energizing relay connected between said operating relays and said power source and energized by said power source through a pair of normally open contacts on said operating relays to energize said operating relays for an interval after said starting relays are de-energized, said sequential switches being respectively energized by said power source through a pair of normally open contacts on said operating relays whereby said capacitors are connected to said power line according to a predetermined sequence and disconnected from said power line in the order in which they were connected thereto, and a pair of time delay action solenoids having coils respectively connected to said power source through normally closed contacts of said operating relays and having normally closed contacts respectively connected between said sequential switches and said power source to allow one set of contacts of said switches to close fully before energization of the circuit breaker circuit corresponding thereto.

ORVILLE WASSON.
JAMES R. PALMER.

No references cited.